United States Patent
Cherian

(10) Patent No.: US 7,190,981 B2
(45) Date of Patent: Mar. 13, 2007

(54) APPARATUS, AND ASSOCIATED METHOD, FOR SELECTABLY EXTENDING A TIME PERIOD IN WHICH A MOBILE STATION IS OPERATED IN A NON-SLOTTED MODE

(75) Inventor: George Cherian, San Diego, CA (US)

(73) Assignee: Nokia Corporation, Espoo (FI)

( * ) Notice: Subject to any disclaimer, the term of this patent is extended or adjusted under 35 U.S.C. 154(b) by 210 days.

(21) Appl. No.: 10/864,760

(22) Filed: Jun. 9, 2004

(65) Prior Publication Data

US 2005/0009535 A1 Jan. 13, 2005

Related U.S. Application Data

(60) Provisional application No. 60/482,791, filed on Jun. 26, 2003.

(51) Int. Cl.
 *H04B 1/38* (2006.01)
 *H04B 1/16* (2006.01)
 *H04Q 7/20* (2006.01)

(52) U.S. Cl. .................. 455/574; 455/519; 455/343.5; 370/310

(58) Field of Classification Search ................ 455/574, 455/343.1, 343.2, 343.3, 343.4, 343.5, 572, 455/519; 370/311, 335
See application file for complete search history.

(56) References Cited

U.S. PATENT DOCUMENTS

| 5,884,196 | A | * | 3/1999 | Lekven et al. | ............... | 455/574 |
| 6,522,873 | B1 | * | 2/2003 | Moles et al. | ............. | 455/343.1 |
| 2002/0172165 | A1 | * | 11/2002 | Rosen et al. | ................ | 370/310 |
| 2003/0148785 | A1 | * | 8/2003 | Mangal et al. | ............... | 455/552 |
| 2004/0162095 | A1 | * | 8/2004 | Edwards et al. | ............ | 455/518 |

* cited by examiner

*Primary Examiner*—Tilahun Gesesse
(74) *Attorney, Agent, or Firm*—Alston & Bird LLP

(57) ABSTRACT

Apparatus, and an associated method, by which to facilitate re-establishment of a traffic channel upon which to communicate pursuant to a communication session, such as a push-to-talk communication session, with a mobile station. The mobile station is maintained in a non-slotted, or other higher-power, mode subsequent to release of a traffic channel to facilitate speedy re-establishment of the traffic channel upon a request for the re-establishment. A selector selects a time period during which the mobile station is maintained in the mode, and a notification message is generated for communication to a network part of the radio communication system to identify the time period.

29 Claims, 4 Drawing Sheets

| R-CSCH ORDER | R-DSCH ORDER | ORDER CODE, ORDER (BINARY) | ORDER QUALIFICATION CODE, ORDQ (BINARY) | MORE FIELDS OTHER THAN ORDQ | SUPPORT REQUIRED | P_REV_IN_USE | NAME / FUNCTION |
|---|---|---|---|---|---|---|---|
| 106 | 108 | 112 | 104 | 114 | 116 | 118 | |
| N | Y | 010101 | 00000011 | N | Y | ≥11 | RELEASE ORDER (WITH GOING TO FAST CALL WAIT MODE) |

| ORDER-SPECIFIC FIELD | LENGTH (BITS) |
|---|---|
| 126 — ORDQ | 8 |
| 128 — FAST_CALL_WAIT_TIME | 6 |

144

| FIELD | LENGTH (BITS) |
|---|---|
| ………… | |
| …………….. | |
| 146 — T_MAX_FAST_CALL_WAIT_TIME | 6 |

APPARATUS, AND ASSOCIATED METHOD, FOR SELECTABLY EXTENDING A TIME PERIOD IN WHICH A MOBILE STATION IS OPERATED IN A NON-SLOTTED MODE

CROSS-REFERENCE TO RELATED APPLICATIONS

The present invention claims the priority of Provisional Patent Application of application Ser. No. 60/482,791, filed on 26 Jun. 2003, the contents of which are incorporated herein by reference.

The present invention relates generally to a manner by which to facilitate effectuation of a communication service, such as a push-to-talk communication service, in a cellular, or other radio, communication system pursuant to a communication session with a mobile station. More particularly, the present invention relates to apparatus, and an associated method, by which to maintain the mobile station in a non-slotted mode of operation for a selected time period subsequent to release of a traffic channel.

By maintaining the mobile station in the non-slotted mode for the selected time period, a subsequent call set-up is able to be completed as quickly as possible. The mobile station is permitted to return to a slotted mode of operation at the expiration of the selected time period if a subsequent call set-up is not required to re-establish the communication session. Improved set-up times are provided during the selected time period. And, battery power savings are provided by permitting the mobile station to return to a slotted mode of operation if re-establishment of the communication session is not required during the selected time period.

BACKGROUND OF THE INVENTION

A communication system provides for the communication of data between communication stations that are operable in the communication system. The communication stations include at least one communication station that forms a sending station and at least another communication station that forms a receiving station. A communication channel interconnects the sending and receiving stations. Data originated, or otherwise sourced, at a sending station is communicated upon the communication channel for delivery to a receiving station. And, upon delivery of the data to the receiving station, the receiving station operates to recover the informational content of the data.

Many different types of communication systems have been developed to permit the communication of data to perform a wide variety of communication services. And, the network infrastructures of many of such communication systems have been deployed throughout wide geographic areas. Users of the communication systems are able to cause effectuation of communication services through use of communication stations of appropriate communication systems between which communication sessions are formed and data is communicated. Additional types of communication systems that permit additional types of communication services to be effectuated shall likely continue to be developed and deployed as continued advancements in communication technologies permit.

A radio communication system is an exemplary type of communication system. In a radio communication system, the communication channel that interconnects sending and receiving stations is formed of a radio channel defined upon a radio link, a portion of the electromagnetic spectrum. Communication channels utilized in wireline communication systems, in contrast, are defined upon wirelines that interconnect the communication stations. Communication stations of a wireline communication system require, therefore, that communication stations thereof be positioned at locations permitting their connection to wirelines upon which communication channels are definable and upon which data is communicated. Because radio communication systems do not require the use of wirelines to interconnect communication stations, communication stations of a radio communication system can be positioned at locations without regard for the availability of wirelines to interconnect the communication stations. And, therefore, radio communication systems are able to provide for the communication of data even when lack of availability of wireline connections prevents corresponding use of a wireline communication system. Additionally, a radio communication system is amenable for implementation as a mobile communication system in which one or more of the communication stations between which data is communicated is permitted mobility.

A cellular communication system is a type of radio communication system. A cellular communication system includes a fixed network portion that is installed over a geographic area within which communication coverage is available. Both data and voice communications are typically effectuable by way of a cellular communication system. Communications are typically effected through use of mobile stations that are positionable within the coverage area of the network infrastructure of the communication system.

Cellular communication systems are typically constructed to be in operational conformity with an operating standard promulgated by a standard-setting body. Successive generations of operating standards have been promulgated. And, successive generations of cellular communication systems have, correspondingly, been deployed.

So-called first-generation cellular communication systems generally utilize analog communication techniques and provide limited data communication services. Second-generation cellular communication systems generally utilize digital communication techniques and provide additional data communication services. So-called third-generation and new-generation cellular communication systems also generally utilize digital communication techniques and provide multi-rate data communication services.

One exemplary new-generation operating specification, undergoing promulgation, is set forth in an IS2000 (Interim Standard 2000) operating specification. The IS2000 operating specification pertains generally to a cellular communication system that utilizes code-division, multiple-access (CDMA) communication techniques. Push-to-talk (PTT) communications between sets of mobile stations are to be available in such cellular communication systems. Pursuant to a push-to-talk communication session, the mobile stations that are parties thereto must have ready access to a traffic channel to communicate therebetween with minimal delay. While, upon initial call set-up, normal delays associated with call initiation are acceptable, once the push-to-talk communication session has commenced, subsequent communication delays during the communication session, or at least the perception by a user of a continued communication session, should be minimal. Other communication services, analogously, also require ready access to traffic channels to communicate thereon with minimal delay.

Mobile stations operable in conformity with the IS2000 operating specification are selectably operable in a slotted mode of operation in which the mobile station is operated at high power levels intermittently and at lessened power levels during other time periods. If, subsequent to a period of inactivity, the mobile station releases a traffic channel allocated thereto and enters into the slotted mode of operation, increased delays in re-establishing the traffic channel and continuation of the push-to-talk communication session, or other analogous communication session, is possible. That is to say, if the request, such as page message, is delivered to the mobile station when the mobile station is in a low-powered state in the slotted mode of operation, the mobile station does not detect the request. The mobile station must be powered at the high power level to detect the request, and the request to re-establish the traffic channel must be delivered to the mobile station during a high-power interval.

An improved manner by which to operate the mobile station to permit re-establishment of a traffic channel with minimal delay time would facilitate improved push-to-talk operations of the mobile station.

It is in light of this background information related to effectuation of push-to-talk, or other, communication services in a radio communication system that the significant improvements of the present invention have evolved.

SUMMARY OF THE INVENTION

The present invention, accordingly, advantageously provides apparatus, and an associated method, by which to facilitate effectuation of a communication service, such as a push-to-talk (PTT) communication service in a cellular, or other radio, communication system pursuant to a communication session with a mobile station.

Through operation of an embodiment of the present invention, a manner is provided by which to maintain the mobile station in a non-slotted mode of operation for a selected time period subsequent to release of a traffic channel.

Call set-up times required to perform call set-up procedures in a subsequent communication session are reduced by maintaining the mobile station in a non-slotted mode when the subsequent call set-up is performed during the selected time period subsequent to the release of the traffic channel. At the expiration of the selected time period, the mobile station is permitted to return to a slotted mode of operation if a subsequent call set-up is not requested to re-establish the communication session.

Improved set-up times are provided during the selected time period, minimizing delays in establishing a traffic channel upon which to communicate. And, by permitting the mobile station to enter into a slotted mode of operation upon expiration of the selected time period if re-establishment of a communication session is not requested during the selected time period, battery savings are provided. When the mobile station is operated in the slotted mode, the mobile station is powered at high power levels only for selected intervals and, otherwise, is powered at lowered power levels. By permitting the mobile station to enter into the slotted mode of operation upon the expiration of the selected time period, the power savings associated with operation of the mobile station in the slotted mode of operation permits battery longevity extension.

In one aspect of the present invention, a notification message is generated at the mobile station that identifies the duration of the selected time period during which the mobile station shall remain in the non-slotted mode of operation subsequent to release of a traffic channel used pursuant to a communication session to effectuate a communication service, such as a push-to-talk communication service. Alternately, a slotted mode of operation having increased lengths of higher-power periods are used. The notification message is communicated by the mobile station, for instance, together with a release order in which the mobile station releases the traffic channel used during a communication session.

The notification message forms, for instance, a multi-field message including an order qualification code (ORDQ) field and a fast call wait time field populated with values that identify the length of the selected time period during which the mobile station shall remain in the non-slotted mode subsequent to release of the traffic channel. And, the release order includes, for instance, a field identifying the order qualification code (ORDQ) associated with the notification message. Communication of the notification message to the network part of the communication system alerts the network part of the extension of operation and the duration of the extension of operation of the mobile station in the non-slotted mode.

In another aspect of the present invention, a new operational mode is defined at the mobile station. The mobile station enters into the new operational mode upon release of the traffic channel allocated thereto pursuant to a communication session, such as the aforementioned push-to-talk communication session. The new operating mode is a non-slotted mode of operation. The new operating mode forms a traffic channel conversation mode upon release of the traffic channel by the mobile station. And, the mobile station remains in the new operating mode for the selected time period unless a request to re-establish the traffic channel, i.e., allocation of the traffic channel to the mobile station, is made. The request is formed, for instance, of delivery to the mobile station of a page generated by the network part of the communication system for the mobile station to form part of a communication session. In the event that a page message is not delivered to the mobile station, or the mobile station otherwise is not caused to reenter the traffic channel conversation mode, the mobile station transitions into an idle, slotted mode of operation. When in the idle slotted mode of operation, the mobile station is operated intermittently at high power levels and otherwise at low power levels according to a slot cycle index (SCI).

In another aspect of the present invention, the selected time period during which the mobile station remains in a non-slotted mode of operation subsequent to release of a traffic channel pursuant to a communication session is selectable between a minimal period and a maximum allowable time period. The maximum allowable time period is, for instance, a network-defined parameter, provided to the mobile station by the network part of the communication system. The maximum time period is contained, for instance, in a field defined in a traffic system parameter message broadcast by the network part of the communication system.

Because the mobile station delays entry into the non-slotted mode upon release of a traffic channel allocated thereto pursuant to a communication session, re-establishment of the traffic channel, if requested during the delay period, is minimized. And, because the mobile station is permitted to enter into the slotted mode of operation upon expiration of the delay period without request to re-establish the traffic channel, battery savings associated with operation of the mobile station in the slotted mode of operation are also provided.

In these and other aspects, therefore, apparatus, and an associated method, is provided for a radio communication system. The radio communication system has a mobile station selectably operable to communicate by way of a network part pursuant to a selected communication session upon a traffic channel allocated for the communication session. The mobile station is operated in a non-slotted mode during the selected communication session. Re-establishment of the traffic channel subsequent to the end of the first selected communication session is facilitated. A notifier is embodied at the mobile station. The notifier is adapted to receive indication of the end of the first selected communication session. The notifier generates a notification message for communication to the network part. The notification message notifies the network part of maintenance of the mobile station in the non-slotted mode for a selected time period beyond the end of the first selected communication session.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 4 illustrates a representation of an exemplary release order generated during operation of the mobile station in the radio communication system shown in FIG. 1.

DETAILED DESCRIPTION

Figure 1:
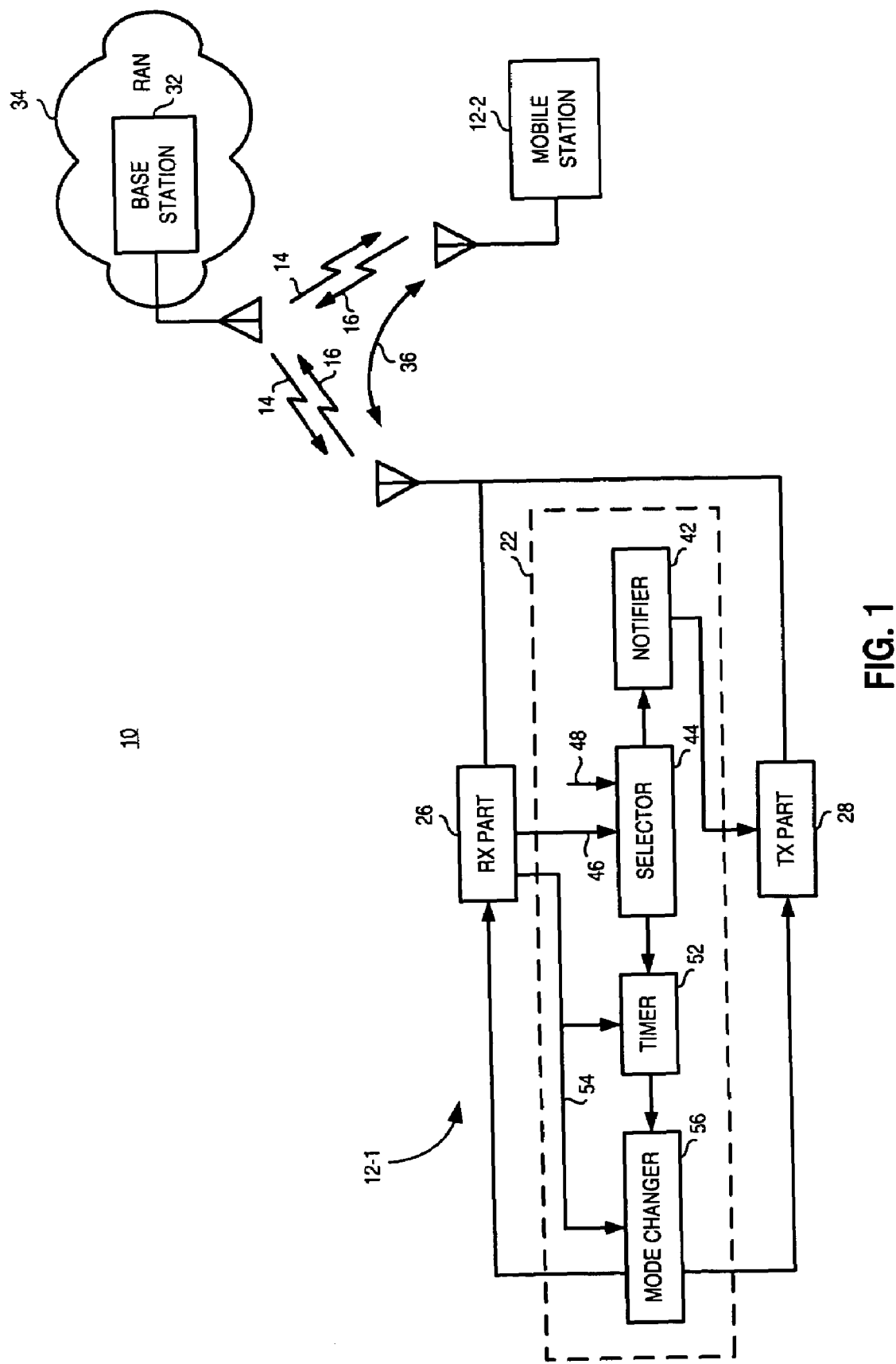
FIG. 1 illustrates a functional block diagram of a radio communication system in which an embodiment of the present invention is operable.

Referring first to FIG. 1, a radio communication system, shown generally at 10, provides for the communication of data pursuant to effectuation of communication services with mobile stations, of which the mobile stations 12 are representative. The radio communication system includes a network part with which the mobile stations communicate by way of radio channels formed upon a radio air interface defined between the network part and the mobile stations. Two-way communication of data permits data originated at the network part to be communicated to the mobile stations by way of forward link channels. And, data originated at the mobile stations are communicated to the network part by way of reverse link channels. The arrows 14 and 16 are representative of the forward and reverse link channels, respectively.

In the exemplary implementation, the radio communication system forms a cellular communication system operable generally pursuant to the operating protocols defined in a variant of the IS2000 operating specification. Code-division, multiple-access communication techniques are utilized and data-intensive communication services are selectably implementable. And, telephonic communications are also implementable. For instance, push-to-talk (PTT) communication services between sets of mobile stations, here, e.g., the mobile stations 12-1 and 12-2, are also implementable during operation of the radio communication system. During a push-to-talk communication session, telephonic communication between mobile stations that are parties to the PTT communication session exhibit minimal access delays.

The minimal access delay associated with PTT communications is provided, in large part, due to the allocation of a traffic channel, or other reserved communication channel, available to any of the mobile stations that are parties to the PTT communication session. The allocation of the channel to the mobile stations that are parties to the PTT, or analogous, communication session is bandwidth consumptive and power-consumptive. When the ready access to the traffic, or other, channel is no longer required, a terminating mobile station releases its allocation of the traffic, or other, channel. And, the mobile station enters into an idle mode of operation in which the mobile station is operated in a slotted mode having low-power and high-power operating intervals defining a slot cycle index (SCI).

The mobile station conventionally, immediately upon release of the traffic, or other, channel enters into the idle, slotted mode of operation. Another mobile station forming a party to the PTT communication session might, however, intend to communicate further pursuant to a PTT communication session. If further communications are intended, the further communications are, perhaps, more likely during times immediately following the release by the mobile station of the traffic, or other, channel. Additional, and perhaps noticeable, time delay are associated with re-establishment of communications when the mobile station is in the slotted mode of operation. Were the mobile station to detect the request to re-establish the traffic channel, the mobile station must be in the high-powered mode, and the mobile station is in the high-powered mode only during portions of the time period in which the mobile station is in the slotted mode.

The mobile station 12 includes apparatus 22 of an embodiment of the present invention by which to facilitate operation of the mobile station to establish more readily the traffic, or other, channel by way of which to communicate pursuant to a PTT, or other, communication session. The apparatus 22 is functionally represented and is formed of elements that are implementable in any desired manner such as, for instance, algorithms executable by processing circuitry.

The apparatus is coupled to the radio transceiver circuitry of the mobile station, here represented by a receive part 26 and a transmit part 28. The receive part operates to receive and to operate upon data communicated to the mobile station by the network part on the forward link channels 14. And, the transmit part operates to transmit data originated at the mobile station for communication by way of reverse link channels to the network part.

The network part includes a plurality of spaced-apart, fixed-site radio transceivers, referred to as base stations, of which a single base station 32 is shown in the figure. The base station 32 forms a portion of a radio access network (RAN) 34.

During a PTT communication session, a communication path, represented by the arrow 36, is formed between the mobile stations that are parties to the PTT session. Here, two mobile stations are parties to the PTT session. While the apparatus 22 and radio transceiver circuitry of only a single one of the mobile stations is shown in the figure, others of the mobile stations also are formed of corresponding entities and structures.

The apparatus includes a notification message generator 42 that operates to generate a notification message to be transmitted by the mobile station that identifies the selected time period during which the mobile station shall remain in a non-slotted mode, or a mode other than an idle, slotted mode of operation upon release of a traffic channel by the mobile station. The notification message generated by the generator 42 is provided to the transmit part 28 of the mobile station for transmission therefrom to the network part.

The apparatus also includes a selector 44 that operates to select the time period during which the mobile station shall remain in the non-slotted mode subsequent to the release of the traffic channel. Selection made by the selector, in one implementation, is made responsive to externally-generated signals sent to the mobile station or is locally selected. When the values used by the selector to select the selected time period is externally generated and supplied to the mobile station, the value of the selected time period is provided to the selector by way of the line 46 that interconnects the receive part and the selector. And, when the selection is based upon locally-generated indicia, the indicia is provided to the selector by way of the line 48. Selections made by the selector are provided to the notifier to form part of the notification message.

The apparatus further includes a timer 52. The timer operates to time out for a time period corresponding to the time period selected by the selector. Indications of selection made by the selector are also provided to the timer, and the timer times-out for the time period selected by the selector. In the exemplary implementation, the timer commences timing upon release of the traffic channel by the mobile station. If, during the timing period of the timer, a request is made to re-establish the traffic channel, the timer resets itself. A request to re-establish the traffic channel, when externally generated, forms a page message broadcast to the mobile station. And, indications of the request are provided on the line 54, here extending from the receive part 26.

The apparatus further includes a mode changer 56. The mode changer is selectably operable to cause the mode in which the mobile station operates to change. Lines extend between the mode changer and the receive and transmit parts 26 and 28 of the mobile station to cause the modes in which the radio transceiver circuitry of the mobile station to be operated in conformity with the changes initiated by the mode changer. The mode changer is here coupled to receive indications of time-out of the timer and, here, also to receive indications of a page to the mobile station to request re-establishment of a traffic channel. When the mobile station releases its traffic channel allocated thereto at the end of a PTT communication session, the mode changer maintains the mobile station in the non-slotted mode of operation, or at least a mode other than an idle, slotted mode of operation, until the timer times out. The timer is reset in the event that a traffic channel is to be re-established or, through application of an indication of the request directly to the mode changer, the mode changer is caused to prevent change of the mode of the mobile station.

Thereby, the mobile station is maintained in a mode of operation that facilitates speedy re-establishment of a traffic channel at least for a selected time period following release of the traffic channel. When a communication session ends, the change of state of the mobile station into an idle, slotted mode is delayed for a period. And, during the period of the delay, if a request to re-establish the traffic channel is delivered to the mobile station, the mobile station is better able quickly to detect and respond to the request.

Figure 2:
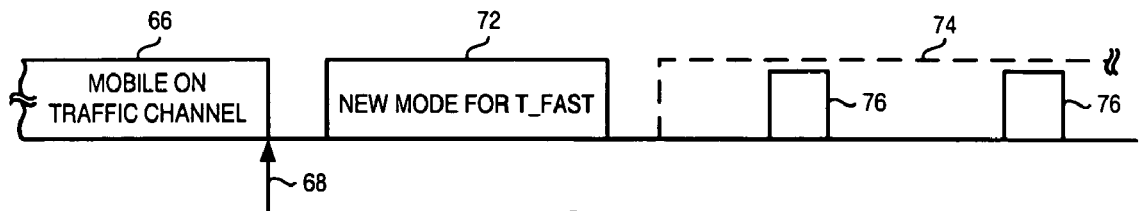
FIG. 2 illustrates a diagram showing modes of operation, plotted as a function of time, of the mobile station of an embodiment of the present invention and that forms a portion of the radio communication system shown in FIG. 1.

FIG. 2 illustrates a representation, shown generally at 64, of separate modes in which the mobile station is operable, here represented as a function of time. During a first period, represented by the time period 66, the mobile station is in a full-power mode, and the mobile station is operable pursuant to a communication session, such as a PTT communication session. At the time indicated by the arrow 68, the mobile station releases its traffic channel. Pursuant to operation of an embodiment of the present invention, rather than entering into an idle, slotted mode of operation, the mobile station is maintained in a higher-power mode 72. In the exemplary implementation, the higher power mode forms a non-slotted mode of operation. In other implementations, the higher power mode of operation forms a slotted mode, but with higher average power levels such as through increased periods of high-powered portions relative to low-powered portions of the slotted mode. The higher-power mode 72 in which the mobile station is maintained continues for a time period, e.g., thirty seconds, or another selectable period. Upon expiration of the time period, the mobile station enters into idle, slotted mode of operation 74, in which, here, two slots 76 are of high-powered periods are represented. Because the mobile station is caused to not immediately to enter into the idle, slotted mode of operation, the mobile station is better able to more quickly to re-establish communications if a request to do so is made when the mobile station is in the mode 72.

Figure 3:
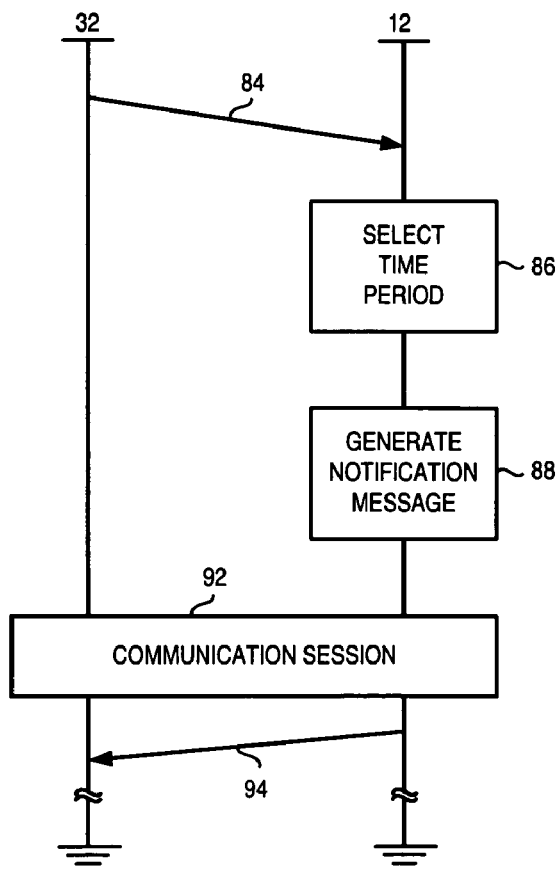
FIG. 3 illustrates a message sequence diagram representative of signaling generated during operation of the radio communication system shown in FIG. 1.

FIG. 3 illustrates a message sequence diagram, shown generally at 82, representative of signaling generated during the radio communication system 10, shown in FIG. 1. The signaling is representative of signaling between a base station 32 and a mobile station 12. First, and as indicated by the segment 84, a traffic system parameter message is generated at the base station and sent to the mobile station. The traffic system parameter message here includes a value that indicates a maximum time period permitted in which the mobile station can remain in a non-slotted mode, or other higher-power level mode of operation. The mobile station, here at least in part responsive to the message sent by the base station, selects, as indicated by the block 86, the selected time period during which the mobile station shall remain in the higher-power mode subsequent to release of the traffic channel. Then, and as indicated by the block 88, the mobile station generates a notification message for notification of the selected time period.

Thereafter, during a subsequent communication session, here indicated by the block 92, a decision is made by the mobile station to release the traffic channel by way of which the communication session is effectuated. And, pursuant to the release, the mobile station generates a release order, generated by the segment 94, that includes the notification message as a portion thereof. That is to say, the release order includes an identification of the selected time period during which the mobile station shall remain in the higher-power mode, here, e.g., the non-slotted mode of operation. The mobile station is maintained in the mode for the selected time period.

FIG. 4 illustrates a table, shown generally at 102, representative of the format of a release order that is generated during operation of the mobile station, shown in FIG. 1, and that includes a field 104 that indicates that the mobile station shall enter into a state other than the idle, slotted mode of operation. The indication here is formed in an order qualification code (ORDQ) here of a value of 00000011. Other fields, an R-CH order field 106, an R-DSCH order field 108, an order code 112, an other field indicator 114, a support required field 116, and field 118 also form portions of the release order. The identification of the release order is also indicated in the representation.

Figures 5, 6, 7:
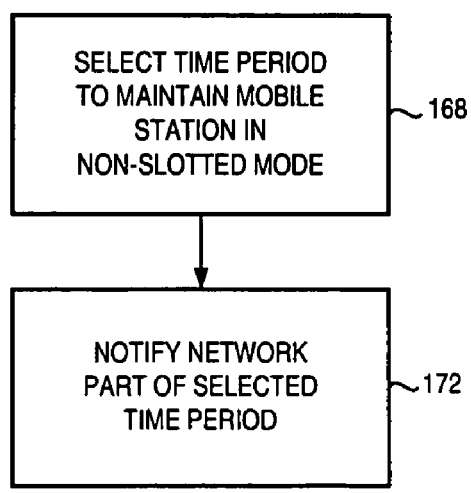
FIG. 5 illustrates an exemplary notification message generated during operation of the mobile station shown in FIG. 1 pursuant to an embodiment of the present invention.
FIG. 6 illustrates portions of an exemplary traffic system parameter message generated during operation of the radio communication system shown in FIG. 1 pursuant to an embodiment of the present invention.
FIG. 7 illustrates a method flow diagram listing the method steps of the method of operation of an embodiment of the present invention.

FIG. 5 illustrates a representation, shown at 124, representative of a notification message, here defined in terms of the ORDQ field 126 and a fast call wait time 128. The fast call wait time identifies the selected time period selected by which to maintain the mobile station in the non-slotted, or other higher-power, mode subsequent to release of the traffic channel.

In the exemplary implementation, the network part sends a traffic system parameter message to the mobile station to alert the mobile station to a maximum permitted, selected time period permitted of the mobile station to maintain a higher-power mode subsequent to release of its traffic channel. FIG. 6 illustrates part of an exemplary traffic system parameter message, shown at 144. The message includes a field 146 that identifies the maximum permitted time period. In the exemplary implementation, the bit length of this field is six bits.

FIG. 7 illustrates a method flow diagram, shown generally at 152, representative of the method of operation of an embodiment of the present invention. The method facilitates re-establishment of a traffic channel subsequent to end of a first selected communication session by a mobile station.

First, and as indicated by the block 168, a time period beyond the end of the first communication session is selected during which to maintain the mobile station in a non-slotted mode of operation. Then, and as indicated by the block 172, the network part is notified of the time period that is selected.

Thereby, through operation of an embodiment of the present invention, a manner is provided by which to maintain a mobile station in a non-slotted mode of operation, or other higher-power mode of operation, subsequent to release by the mobile station of a traffic channel allocated to the mobile station pursuant to a push-to-talk, or other, communication session. Reduced delays in communications result.

The previous descriptions are of preferred examples for implementing the invention, and the scope of the invention should not necessarily be limited by this description. The scope of the present invention is defined by the following claims.

What is claimed is:

1. In a radio communication system having a mobile station selectably operable to communicate by way of a network part pursuant to a selected communication session upon a traffic channel allocated for the communication session, the mobile station operated in a non-slotted mode during the selected communication session, an improvement of apparatus for facilitating re-establishment of the traffic channel subsequent to end of the selected communication session, said apparatus comprising:
a notifier embodied at the mobile station and adapted to receive indication of the end of the selected communication session, said notifier for generating a notification message for communication to the network part, the notification message for notifying the network part of maintenance of the mobile station in the non-slotted mode for a selected time period beyond the end of the selected communication session.

2. The apparatus of claim 1 further comprising a selector embodied at the mobile station, said selector for selecting the selected time period beyond the end of the selected communication session during which to maintain the mobile station in the non-slotted mode.

3. The apparatus of claim 2 further comprising a timer embodied at the mobile station, said timer adapted to receive indications of selection made by said selector, said timer for timing the selected time period.

4. The apparatus of claim 3 further comprising a mode changer embodied at the mobile station and adapted at least to receive indications of when said timer times-out of the selected time period, said mode changer selectably for changing the mobile station out of the non-slotted mode upon expiration of the selected time period.

5. The apparatus of claim 4 wherein said mode changer is further adapted to receive indications of request to re-establish the traffic channel subsequent to the end of the selected communication session and prior to the expiration of the selected time period, said mode changer further selectably for maintaining the mobile station in the non-slotted mode responsive to detection of the indications of the request to re-establish the traffic channel.

6. The apparatus of claim 4 wherein said timer is further adapted to receive indications of request to re-establish the traffic channel subsequent to the end of the selected communication session and prior to the expiration of the selected time period, said timer reset responsive to detection of the indications of the request to re-establish the traffic control.

7. The apparatus of claim 4 wherein the mobile station is further selectably operable in a slotted mode and wherein said mode changer is selectably for changing the mobile station out of the non-slotted mode and into the slotted mode upon expiration of the selected time period.

8. The apparatus of claim 1 wherein the mobile station is further selectably operable in a slotted mode and wherein the mobile station is selectably permitted to be operated in the slotted mode subsequent to the selected time period, identified in the notification message, beyond the end of the selected communication session.

9. The apparatus of claim 1 wherein operation of the mobile station in the non-slotted mode pursuant to the selected communication session comprises a traffic channel mode, and wherein the selected time period beyond the end of the selected communication session during which the mobile station is maintained in the non-slotted mode comprises a fast call wait mode of operation.

10. The apparatus of claim 9 wherein the mobile station is further selectably operable in an idle, slotted mode and wherein the mobile station is further selectably permitted to enter the idle, slotted mode upon expiration of the selected time period.

11. The apparatus of claim 1 wherein the mobile station generates a release order at the end of the selected communication session and wherein the notification message generated by said notifier is generated together with the release order.

12. The apparatus of claim 11 wherein the release order comprises a notification-message field, the notification-message field at least identifying operation of the mobile station in the non-slotted mode beyond the end of the selected communication session.

13. The apparatus of claim 11 wherein the notification message generated by said notifier comprises a time field, the time field populated with values identifying the selected time period during which the mobile station is to be maintained in the non-slotted mode.

14. The apparatus of claim 13, wherein the release order comprises information specifying to the mobile station to release the traffic channel subsequent to an end of the selected communication session and wherein the at least a portion of information corresponds to the values populated in the time field of the notification message.

15. The apparatus of claim 1 wherein the selected time period for which the notification message notifies the network part that the mobile station shall remain in the non-slotted mode beyond the end of the selected communication session comprises an amount of time up to a maximum time period.

16. The apparatus of claim 1 wherein the selected communication session comprises a push-to-talk communication session effectuated upon the traffic-channel and wherein maintenance of the mobile station in the non-slotted mode for the selected time period identified by the notification message generated by said notifier facilitates re-establishment of the traffic channel to permit a continued push-to-talk communication session.

17. The apparatus of claim 1, wherein the mobile station receives a parameter message transmitted by the network part, the parameter message comprising a value indicating a minimum time period and a maximum time period in which the mobile station is capable of remaining in the non-slotted mode.

18. The apparatus of claim 1 further comprising, a mode changer embodied at the mobile station that determines whether connection to the traffic channel is re-established during the selected time period and when the connection to the traffic channel is not re-established during the selected time period, the mode changer changes the mobile station from the non-slotted mode to a slotted mode in which the mobile station monitors the traffic channel according to a slot cycle.

19. The apparatus of claim 1, wherein the notification message identifies a duration of the selected time period which specifies a time in which the mobile station remains in the non-slotted mode beyond the end of the selected communication session.

20. In a method of communicating in a radio communication system having a mobile station selectably operable to communicate by way of a network part pursuant to a selected communication session upon a traffic channel allocated for the communication session, the mobile station operated in a non-slotted mode during the selected communication session, an improvement of a method for facilitating re-establishment of the traffic channel subsequent to end of the selected communication session, said method comprising the operations of:
  selecting a time period beyond the end of the communication session during which to maintain the mobile station in the non-slotted mode; and
  notifying the network part of the time period selected during said operation of selecting.

21. The method of claim 20 wherein said operation of notifying comprises the operations of:
  generating a notification message that includes indication of the selected time period; and
  sending the notification message to the network part.

22. The method of claim 21 wherein the mobile station sends a release order to release the traffic channel at the end of the selected communication session and wherein the notification message sent during said operation of sending is sent together with the release order.

23. The method of claim 21 further comprising the operation of maintaining the mobile station in the non-slotted mode for at least the selected time period beyond the end of the communication session.

24. The method of claim 21, wherein the notification message comprises a time field among a plurality of fields, the time field comprises values identifying the selected time period in which to maintain the mobile station in the non-slotted mode.

25. The method of claim 21, wherein the notification message identifies a duration of the selected time period which specifies a time in which the mobile station remains in the non-slotted mode beyond the end of the selected communication session.

26. The method of claim 20 wherein the time period selected during said operation of selecting is less than a maximum time period.

27. The method of claim 20, further comprising:
  receiving indications of when the selected time period expires; and
  changing the mobile station out of the non-slotted mode to a slotted mode, in which the mobile station monitors the traffic channel according to a slot cycle, when the selected time period expires.

28. The method of claim 20, further comprising receiving a parameter message transmitted by the network part, the parameter message comprising a value indicating a minimum time period and a maximum time period in which the mobile station is capable of remaining in the non-slotted mode.

29. The method of claim 20, further comprising:
  receiving indications of a request to re-establish the traffic channel subsequent to the end of the selected communication session and prior to the expiration of the selected time period; and
  resetting a timer, which times the selected time period, responsive to detection of the indications of the request to re-establish the traffic channel.

* * * * *